May 23, 1950 R. SCHNEIDER Re. 23,233

MILK STRAINER PAD DISPENSER

Original Filed June 24, 1947 3 Sheets-Sheet 1

Inventor

Roland Schneider

By L. B. James

Attorney

MILK STRAINER PAD DISPENSER

Original Filed June 24, 1947 3 Sheets-Sheet 2

Inventor

Roland Schneider

By L. B. James

Attorney

MILK STRAINER PAD DISPENSER

Original Filed June 24, 1947 3 Sheets-Sheet 3

Inventor

Roland Schneider

By L. B. James

Attorney

Reissued May 23, 1950

Re. 23,233

UNITED STATES PATENT OFFICE 23,233

MILK STRAINER PAD DISPENSER

Roland Schneider, Deer Creek, Wis., assignor, by mesne assignments, to The Fulpit Company, Milwaukee, Wis., a corporation of Wisconsin Original No. 2,428,530, dated October 7, 1947, Serial No. 756,759, June 24, 1947. Application for reissue September 17, 1949, Serial No. 116,281

5 Claims. (Cl. 312—51)

This invention relates to the official class of dispensers and more particularly a milk strainer pad dispenser.

The primary object of this invention resides in the provision of a milk strainer pad dispenser in which a multiplicity or pack of pads are disposed for single delivery therefrom to promote sanitary handling of the same by help in dairies.

Another object of this invention resides in the particular construction of the milk strainer pad dispenser.

A further object of this invention resides in the particular construction of the pad selecting means of the dispenser.

A still further object of this invention resides in the particular construction of the locking means for the hinged bottom of the dispenser.

With these and other objects in view, this invention resides in certain novel features of construction and arrangement of elements to be hereinafter more particularly set forth in the specification, illustrated in the accompanying drawings and pointed out in the appended claims and, although this disclosure depicts my present conception of the invention, the right is reserved to resort to such departures therefrom as come within the scope of the claims.

In the accompanying drawings forming a part of this application;

Figure 1:
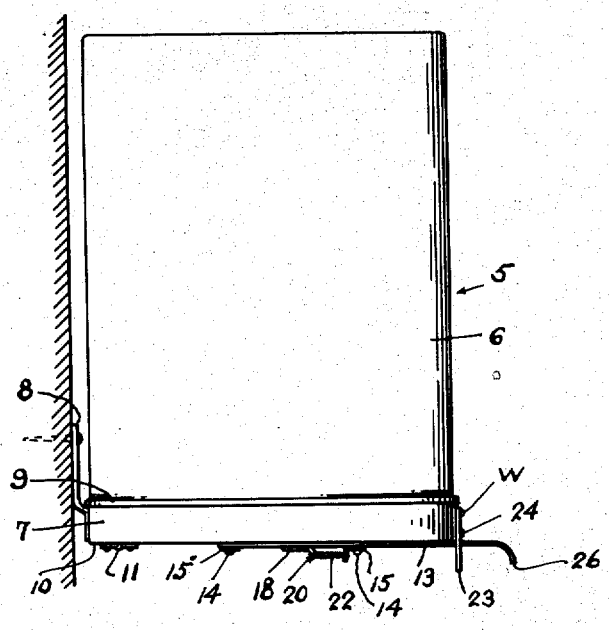
Fig. 1 is a side view of the dispenser.
Figure 2:
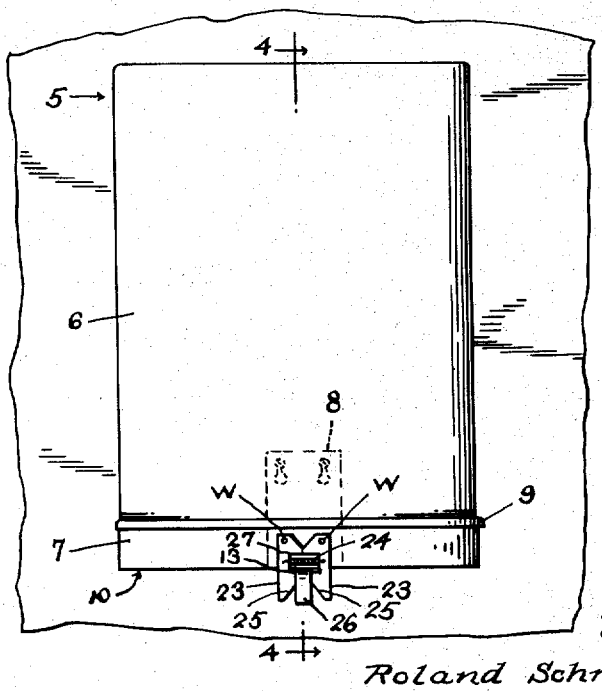
Fig. 2 is a front view thereof.
Figure 3:
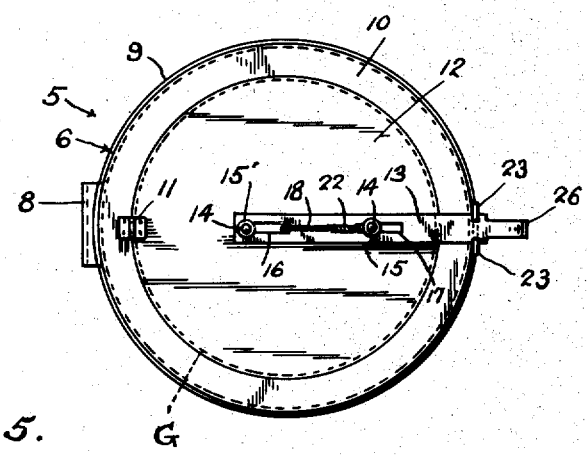
Fig. 3 is a bottom view thereof.
Figure 5:
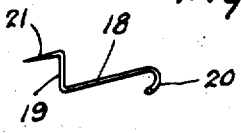
Fig. 5 is a perspective view of the pad selector.
Figure 7:
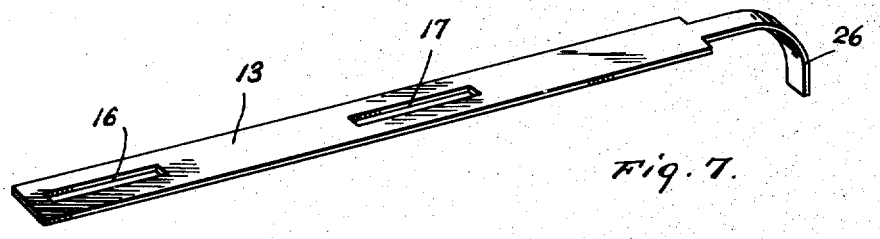
Fig. 7 is a perspective view of a slidable handle per se.
Figure 6:
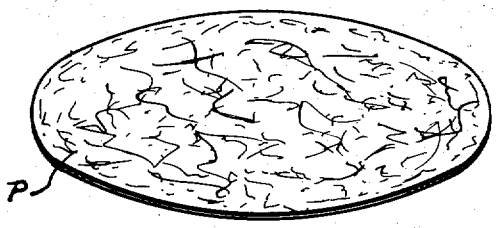
Fig. 6 is a similar view of one of the pads.
Figure 4:
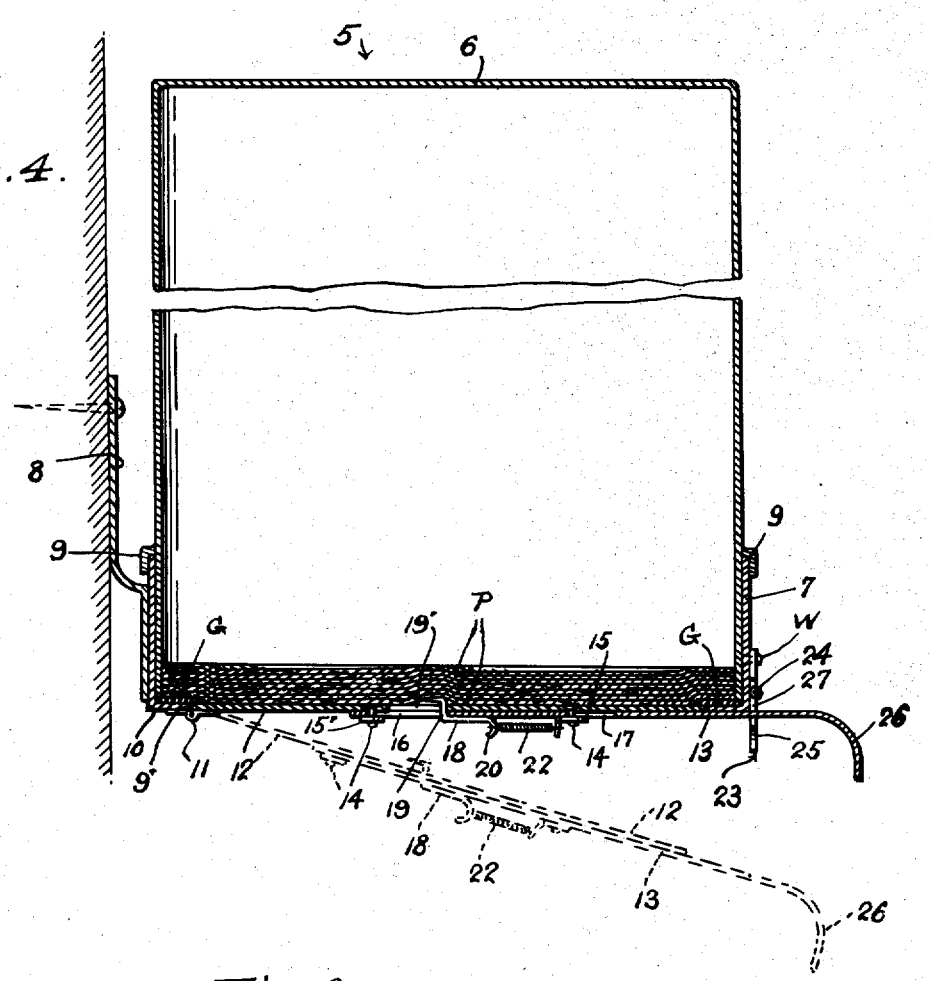
Fig. 4 is an enlarged vertical sectional view taken approximately on line 4—4 of Fig. 2.
Figure 8:
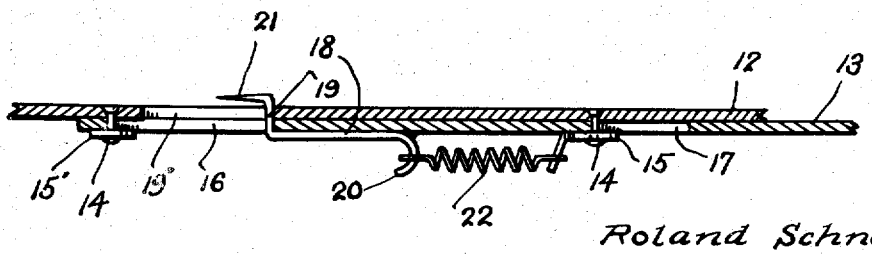
Fig. 8 is an enlarged sectional view taken through a portion of the door and selector.

In the present illustration of this invention the numeral 5 designates, in general, a milk strainer pad dispenser preferably consisting of a cylindrical receptacle 6 open at its lower end and removably disposed in a cylindrical base 7 secured to a support by a suitable bracket 8 formed thereon. Said receptacle 6 is provided with an annular flange 9 adapted to surround and enclose the upper edge of the base 7 to prevent foreign matter from seeping or flowing into the base and thereby contaminating milk straining pads P within the lower end of the receptacle.

Formed in the bottom of the base is an enlarged opening 9′ of lesser diameter than the pads so as to provide an inturned flange 10 of sufficient area to support a multiplicity of pads in the receptacle and permit the lowermost one thereof to be readily withdrawn through said opening without damage thereto.

Preferably secured as by a hinge 11 to that side of the flange 10 adjacent the bracket 8 is a disc-shaped door 12 provided with a slidable handle 13 herein shown as attached to the outer surface of the door by rivets 14 passing through washers 15 and 15′ and slots 16 and 17 in the handle with their inner ends welded or otherwise secured to the door just so the inner or milk pad contacting surface thereon is smooth.

Secured on the handle is a pad selector or pin 18 having one end bent, as indicated by the numeral 19, and extending through the slot 16 in the handle and narrow slot 19 in the door. Said selector or pin 18 is provided with a substantially semicircular loop 20 at its outer end and a sharpened point 21 at its inner end, the former of which is attached to the washer 15 or other stationary portion of the door by a retractile coil spring 22 to retain the handle with the selector thereon in outward position between locking jaws or latch 23 pivoted to the front of the base as indicated by the letter W and retained in locking position by a retractile spring 24. Said latch locking jaws 23 have their opposed lower edges 25 bevelled to readily guide a reduced and downwardly curved outer portion 26 of the handle into an opening 27 communicating with the space between the jaws when closing the door.

With this dispenser hung on a support in a dairy or milking shed, the attendant simply removes the receptacle and empties a container or milk strainer pads therein without touching the same and, thereafter, places the filled receptacle on the base for successive removing of the lowermost pads therefrom by pressing the slidable handle inwardly to insert the point of the selector in the same, during which operation the reduced portion of the handle is released from the latch and the door is swung downwardly with a pad thereon for removing by the attendant or milker.

Through the instrumentality of the aforesaid dispenser, it is manifest that milk strainer pads are handled and retained in sanitary condition by means of such simple construction that positive operation thereof is assured.

Having thus described my invention, what I claim and desire to protect by Letters Patent is:

1. A dispenser for milk strainer pads comprising, a cylindrical base, an inturned flange on the bottom of the base and having an enlarged opening centrally disposed therein, a cylindrical milk strainer pad retaining receptacle having an open lower end resting on the inturned flange of the base, an annular flange on the receptacle overlying and enclosing the upper edge of the base, a door hingedly connected to the inturned flange and normally closing the opening therein, a handle slidably disposed on the outer surface of the door and with a reduced portion thereof extending outwardly of the side of the base, a selector secured to the handle and having an inner sharpened end extending through registered slots in the handle and door, a retractile coil spring connected at one end to the selector and at its opposite end to a stationary portion of the door, jaws pivoted to the base and having opposed bevelled lower edges forming a handle guide communicating with a handle retaining space therebetween, a retractile coil spring connecting the jaws and retaining them in handle locking position, and a bracket secured to the base for retaining it on a support.

2. A milk strainer pad dispenser comprising, a cylindrical base having an enlarged opening in its bottom, a supporting bracket secured to the base, a cylindrical receptacle of greater diameter than the opening in the base and having an open lower end resting on said base so as to dispose milk strainer pads therein over the opening in said base, a door hingedly secured to the base over the opening therein, a milk strainer pad selector having a sharpened point extending inwardly through a slot in the door and beneath the lowermost milk strainer pad in the receptacle, means connected to the selector for forcing it into the lowermost pad in the receptacle, and means securing said means and door in closed position over the opening in the base.

*3. A milk strainer pad dispenser comprising, a cylindrical base having a large opening in its bottom, a supporting bracket secured to the base, a cylindrical receptacle of greater diameter than the opening in the base and having an open lower end resting on said base so as to dispose milk strainer pads therein over the opening in said base, a door hingedly secured to the base over the opening therein, a milk strainer pad selector having a sharpened point extending inwardly through a slot in the door and beneath the lowermost milk strainer pad in the receptacle, a door handle connected to the selector for forcing it into the lowermost pad in the receptacle, and means coacting with said handle for securing said door in closed position over the opening in the base.*

*4. A milk strainer pad dispenser comprising, a cylindrical base having a large opening in its bottom, a supporting bracket secured to the base, a cylindrical receptacle of greater diameter than the opening in the base and having an open lower end resting on said base so as to dispose milk strainer pads therein over the opening in said base, a door hingedly secured to the base over the opening therein, a milk strainer pad selector having a sharpened point extending inwardly through a slot in the door and beneath the lowermost milk strainer pad in the receptacle, a handle connected to the selector and being slidable upon said door to force the selector point into the lowermost pad in the receptacle, and a latch coacting with said handle to secure said door in closed position over the opening in the base.*

*5. A milk strainer pad dispenser comprising, a cylindrical base having a large opening in its bottom, a supporting bracket secured to the base, a cylindrical receptacle of greater diameter than the opening in the base and having an open lower end resting on said base so as to dispose milk strainer pads therein over the opening in said base, a door hingedly secured to the base over the opening therein, a milk strainer pad selector having a sharpened point extending inwardly through a slot in the door and beneath the lowermost milk strainer pad in the receptacle, a handle slidable upon said door and coacting with said selector to force the selector point into the lowermost pad in the receptacle and to remove this pad through said opening when the door is swung open, and latch means coacting with said handle to secure said door in closed position over the opening in the base.*

ROLAND SCHNEIDER.

REFERENCES CITED

The following references are of record in the file of this patent or the original patent:

UNITED STATES PATENTS

| Number | Name | Date |
|---|---|---|
| 1,889,785 | Parker | Dec. 6, 1932 |

FOREIGN PATENTS

| Number | Country | Date |
|---|---|---|
| 38,521 | Sweden | of 1915 |